United States Patent
Yang et al.

(10) Patent No.: US 12,072,576 B2
(45) Date of Patent: Aug. 27, 2024

(54) BACKLIGHT MODULE AND DISPLAY DEVICE

(71) Applicant: TCL CHINA STAR OPTOELECTRONICS TECHNOLOGY CO., LTD., Guangdong (CN)

(72) Inventors: Weiheng Yang, Guangdong (CN); Gang Liu, Guangdong (CN); Wei Wang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/622,774

(22) PCT Filed: Dec. 17, 2021

(86) PCT No.: PCT/CN2021/139290
§ 371 (c)(1),
(2) Date: Dec. 24, 2021

(87) PCT Pub. No.: WO2023/103051
PCT Pub. Date: Jun. 15, 2023

(65) Prior Publication Data
US 2024/0036397 A1    Feb. 1, 2024

(30) Foreign Application Priority Data
Dec. 10, 2021    (CN) .......................... 202111509965.X

(51) Int. Cl.
*G02F 1/13357* (2006.01)
*G02F 1/1335* (2006.01)

(52) U.S. Cl.
CPC .. *G02F 1/133606* (2013.01); *G02F 1/133603* (2013.01); *G02F 1/133607* (2021.01)

(58) Field of Classification Search
CPC .......... G02F 1/133603; G02F 1/133606; G02F 1/133607
See application file for complete search history.

(56) References Cited

U.S. PATENT DOCUMENTS

2021/0231857 A1 * 7/2021 Yu .................... G02B 6/0031

FOREIGN PATENT DOCUMENTS

| CN | 104375236 A |   | 2/2015 |   |             |
|----|-------------|---|--------|---|-------------|
| CN | 106842701 A | * | 6/2017 | ..| G02F 1/133603 |

(Continued)

OTHER PUBLICATIONS

International Search Report in International application No. PCT/CN2021/139290, mailed on Aug. 25, 2022.

(Continued)

*Primary Examiner* — Mariceli Santiago
(74) *Attorney, Agent, or Firm* — PV IP PC; Wei Te Chung; Zhigang Ma

(57) ABSTRACT

Disclosed are a backlight module and a display device. The backlight module includes a plurality of light-emitting units disposed at intervals with one another, an optical film, and a concentrating structure. A slit is between two adjacent light-emitting units. The optical film is disposed at a side of the light-emitting unit. The concentrating structure is disposed at a side of the optical film close to the light-emitting unit and arranged in an area opposite to the slit. The concentrating structure comprises a plurality of protrusions.

16 Claims, 2 Drawing Sheets

(56) References Cited

FOREIGN PATENT DOCUMENTS

| | | | |
|---|---|---|---|
| CN | 109061945 A | | 12/2018 |
| CN | 109283745 A | | 1/2019 |
| CN | 109709720 A | * | 5/2019 |
| CN | 209591361 U | | 11/2019 |
| CN | 110703495 A | | 1/2020 |
| CN | 111445789 A | | 7/2020 |
| CN | 112002217 A | | 11/2020 |
| CN | 113327515 A | | 8/2021 |
| CN | 113721385 A | | 11/2021 |
| CN | 214954432 U | | 11/2021 |
| CN | 114267261 A | | 4/2022 |
| JP | 2010217660 A | | 9/2010 |
| WO | 2021213514 A1 | | 10/2021 |

OTHER PUBLICATIONS

Written Opinion of the International Search Authority in International application No. PCT/CN2021/139290, mailed on Aug. 25, 2022.
Chinese Office Action issued in corresponding Chinese Patent Application No. 202111509965.X dated Jul. 1, 2022, pp. 1-8.

* cited by examiner

BACKLIGHT MODULE AND DISPLAY DEVICE

BACKGROUND

1. Field of the Disclosure

The present disclosure relates to display technology, and more particularly, to backlight module and a display device.

2. Description of the Related Art

With the continuous development of light-emitting diode (LED) technology, a mini LED is utilized as a new type of technology to mobile phones, cars, notebook computers, etc. A direct back-lit source for mini LED technology includes thousands, tens of thousands, and even more mini LED lamp beads so the brightness of the mini LED lamp beads improves to a large extent. In addition, the brightness and darkness of each of the mini LED lamp beads is controlled by a printed circuit board (PCB) individually. In other words, the fineness of high dynamic range imaging (HDR) of a display screen reaches an unprecedented high level.

However, due to the difficulties in the production process and the yield, it is very difficult to arrange thousands or tens of thousands mini LED lamp beads on a single PCB. Instead, thousands or tens of thousands mini LED lamp beads are only spliced on a plurality of PCBs by means of splicing. However, the splicing areas fail to be overlapped completely, which may produce a slight slit and light emission at the splicing slit may be uneven accordingly.

SUMMARY

According to an embodiment of the present disclosure, a backlight module includes a plurality of light-emitting units disposed at intervals with one another, an optical film, and a concentrating structure. A slit is between two adjacent light-emitting units. The optical film is disposed at a side of the light-emitting unit. The concentrating structure is disposed at a side of the optical film close to the light-emitting unit and arranged in an area opposite to the slit. The concentrating structure comprises a plurality of protrusions.

According to another embodiment of the present disclosure, a display device includes a display panel and a backlight module disposed opposite.

The arrangement of a concentrating structure at a slit between adjacent light-emitting units in a backlight module according to the embodiment of the present disclosure makes it possible that refraction of the light from a protrusion in the concentrating structure after the light emitted by the light-emitting units is emitted to the concentrating structure, the emissive direction of the light to an optical film can be expanded so as to enhance the light-emitting uniformity of the area on the optical film that corresponds to the slit. Besides, the concentrating structure is formed by the plurality of diverse protrusions so that moiré patterns are not produced due to coherent interference from the light in the area.

DETAILED DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

In order to solve the above problems, the present disclosure proposes a backlight and a display device. The embodiments of the present disclosure will be further described below in conjunction with the drawings.

Splicing screen technology has been widely applied in large-sized display products, and the splicing screen can be widely adopted for commercial, outdoor, safety monitoring markets, etc. The splicing screen of the related art is spliced by multiple sub-display panels. Something always appears on the splicing area where the two adjacent sub-display panels are arranged, and the "something" is an area called as slit or seam. The light in the seam is weaker than the light in the other areas, thereby forming a clear dark contrast between the slit and the other areas and producing shadows.

Additionally, splicing tolerances are generated among different circuit boards so the LED fails to correspond to one by one, resulting in a light mixing phenomenon and uneven light emitted by the display screen.

Figure 1:
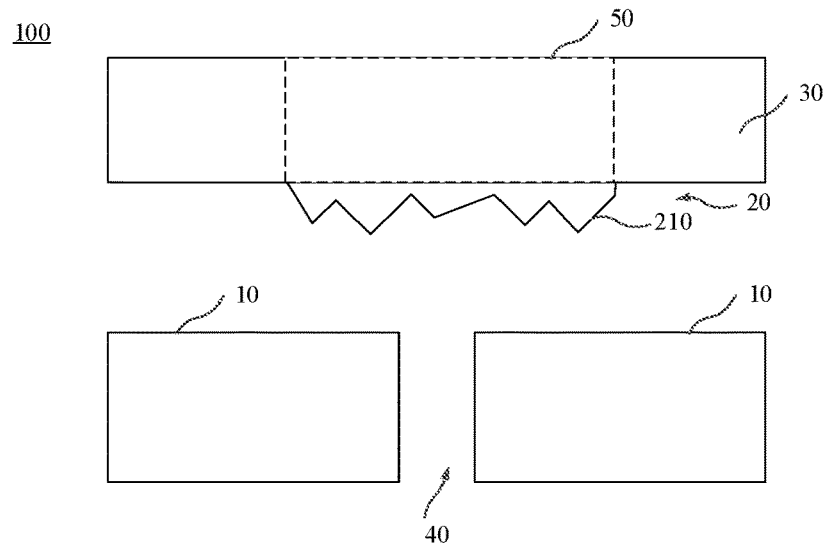
FIG. 1 is a schematic diagram illustrating a backlight module according to an embodiment of the present disclosure.

Please refer to FIG. 1. FIG. 1 is a schematic diagram illustrating a backlight module according to a preferred embodiment of the present disclosure. The backlight module 100 includes a plurality of light-emitting units 10, an optical film 30, and a concentrating structure 20. The plurality of light-emitting units 10 are disposed at intervals with one another. Two of the adjacent light-emitting units 10 includes a slit 40. The optical film 30 is disposed at one side of the light-emitting unit 10. The concentrating structure 20 is disposed at one side of the optical film 30 close to the light-emitting unit 10. The concentrating structure 20 is arranged in an area opposite to the slit 40. The concentrating structure 20 includes a plurality of diverse protrusions 210. The protrusions 210 are configured to emit the light emitted by the light-emitting unit 10 evenly. The arrangement of the concentrating structure 20 at the slit 40 between the adjacent protrusions 210 facilitates refraction of the light from the protrusion 210 in the concentrating structure 20 after the light emitted by the light-emitting unit 10 is transmitted to the concentrating structure 20. Further, the emissive direction of the light to the optical film 30 can be expanded so as to enhance the light-emitting uniformity of the area on the optical film 30 that corresponds to the slit 40. Besides, the concentrating structure 20 is formed by the plurality of diverse protrusions 210 so that moiré patterns are not produced due to coherent interference from the light in the area.

An area on the optical film 30 which is opposite to the slit 40 is defined as a concentrating area 50.

Figure 2:
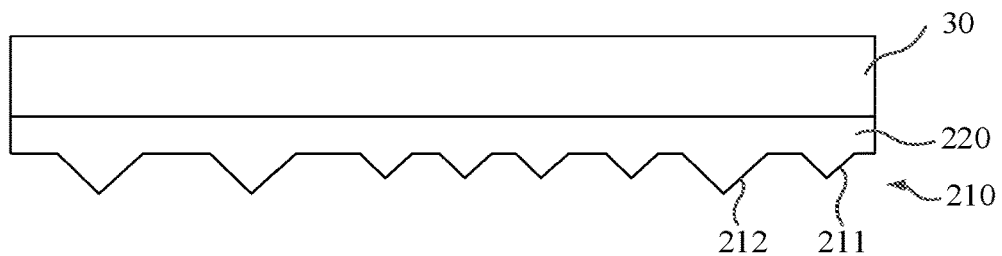
FIG. 2 is a schematic diagram illustrating a first structure of the concentrating structure in the backlight module as shown in FIG. 1.

The size of the one or more protrusion(s) 210 is different from the size of the other protrusions 210. Please refer to FIG. 2. FIG. 2 is a schematic diagram illustrating a first structure of the concentrating structure 20 in the backlight module as shown in FIG. 1. The concentrating structure 20 includes a first protrusion 211 and a plurality of second protrusions 212. The shape of the first protrusion 211 is the same as the shape of the second protrusion 212. The length of the positive projection of the first protrusion 211 on the optical film 30 is different from the length of the positive projection of the second protrusion 212 in the optical film 30. The concentrating structure 20 includes the plurality of first protrusion 211 and the plurality of second protrusions 212. The shape of the first protrusion 211 is the same as the shape of the second protrusion 212. The length of the positive projection of the first protrusion 211 on the optical film 30 is different from the length of the positive projection of the second protrusion 212 in the optical film 30. The concentrating structure 20 includes the plurality of protrusions 210 with diverse sizes. The shape of the first protrusion 211 is the same as the shape of the second protrusion 212. The length of the positive projection of each of the plurality of protrusions 210 on the optical film 30 is different from one another. The embodiment of the present disclosure proposes the concentrating structure 20 including the plurality of diverse protrusions 210. By irregular distribution of the plurality of different protrusions 210, the emissive direction of light is expanded, and the distribution of the light in the concentrating area 50 is more uniform. Moreover, the concentrating structure 20 is a structure with irregular distributions so that moiré patterns are not produced due to coherent interference from the light in the area.

Figure 3:
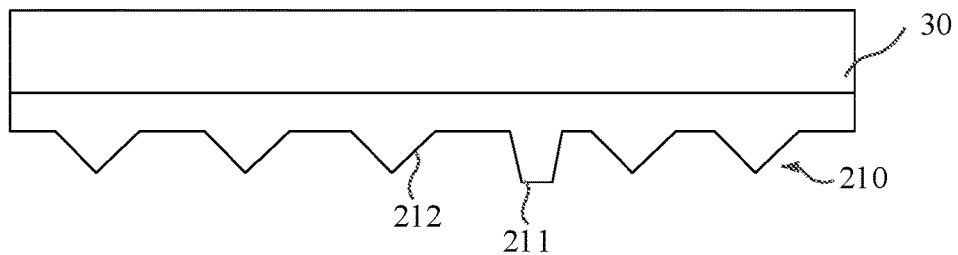
FIG. 3 is a schematic diagram illustrating a second structure of the concentrating structure in the backlight module as shown in FIG. 1.

The shape of the one or more protrusion(s) 210 is/are different from the shape of the other protrusions 210. FIG. 3 is a schematic diagram illustrating a second structure of the concentrating structure 20 in the backlight module 100 as shown in FIG. 1. As shown in FIG. 3, the concentrating structure 20 includes a first protrusion 211 and a plurality of second protrusions 212. The length of the positive projection of the first protrusion 211 on the optical film 30 is the same as the length of the positive projection of the second protrusion 212 in the optical film 30. The shape of the first protrusion 211 is different from the shape of the second protrusion 212. For example, the shape of the first protrusion 211 is a triangle, and the shape of the second protrusion 212 is a trapezoid. Or, the shape of the first protrusion 211 is a right triangle, and the shape of the second protrusion 212 is an equilateral triangle. Or, the shape of the first protrusion 211 is a triangle, and the shape of the second protrusion 212 is a frustum, etc. In a preferred embodiment, the concentrating structure 20 includes a plurality of protrusions 210 with diverse shapes. The shape of the protrusion 210 can be a triangle of any type, a trapezoid of any type, a frustum of any type, or a protrusion with diverse shapes. No specific limitations are determined in the present disclosure as long as the shape of the one or more of the protrusions 210 is different from the shape of the other protrusions 210.

Figure 4:
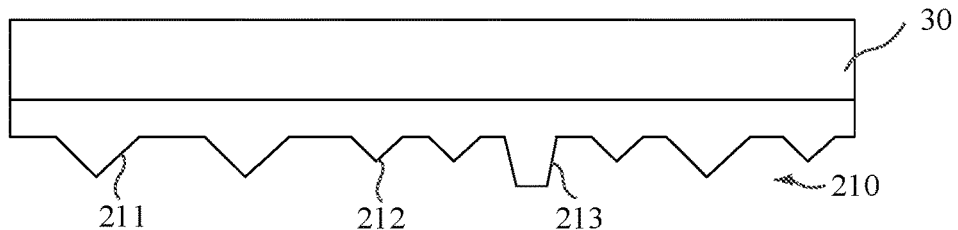
FIG. 4 is a schematic diagram illustrating a third structure of the concentrating structure in the backlight module as shown in FIG. 1.

The size of one or more of the protrusions 210 is different from the size of the other protrusions 210, and the shape of one or more of the protrusion(s) 210 is different from the shape of the other protrusions 210. FIG. 4 is a third schematic diagram of the concentrating structure 20 in the backlight module 100 as shown in FIG. 1. As shown in FIG. 4, the protrusion 210 includes a first protrusion 211, a second protrusion 212, and a third protrusion 213. The shape of the first protrusion 211 is different from the shape of the second protrusion 212, and the size of the first protrusion 211 is different from the size of the second protrusion 212 as well. The shape of the first protrusion 211 is the same as the shape of the second protrusion 212 while the size of the first protrusion 211 is different from the size of the second protrusion 212. The shape of the third protrusion 213 is different from the shape of the second protrusion 212 while the size of the first protrusion 211 is the same as the size of the second protrusion 212. In a preferred embodiment of the present disclosure, the shape of a first protrusion 211, the shape of a second protrusion 212, and the shape of a third protrusion 213 are different from one another, and the size of the first protrusion 211, the size of the second protrusion 212, and the size of the third protrusion 213 are different from one another as well. The design of the protrusion 210 with diverse sizes and shapes in the present disclosure ensures that moiré patterns are not produced on the protrusion 210 due to coherent interference from the light emitted by the light-emitting unit 10 and that the light in the concentrating area 50 becomes more uniform.

Figure 5:
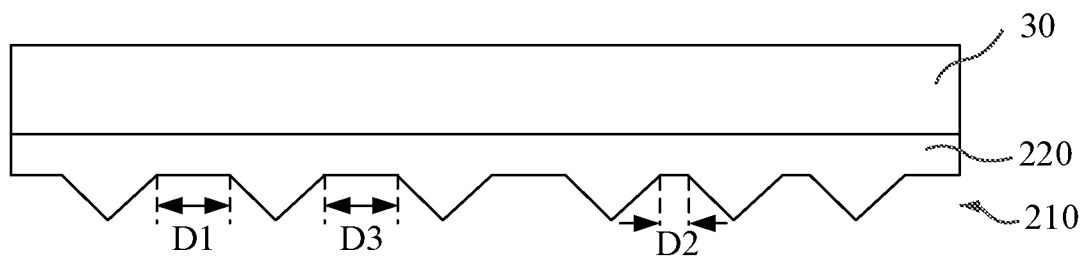
FIG. 5 is a schematic diagram illustrating a fourth structure of the concentrating structure in the backlight module as shown in FIG. 1.

The distance between the two adjacent protrusions 210 is not equal to the other. Please refer to FIG. 5. FIG. 5 is a fourth schematic diagram illustrating the concentrating structure 20 in the backlight module as shown in FIG. 1. The protrusion 210 includes a first protrusion, a second protrusion, a third protrusion, and a fourth protrusion. The first protrusion, the second protrusion, the third protrusion, and the fourth protrusion are arranged close to one another. The distance between the first protrusion and the second protrusion is defined as a first distance D1. The distance between the second protrusion and the third protrusion is defined as a second distance D2. The distance between the third protrusion and the fourth protrusion is defined as a third distance D3. The first distance D1 and the second distance D2 are not equal while the third distance D3 and the first distance D1 or the second distance D2 is equal. In a preferred embodiment of the present disclosure, none of a first distance D1, a second distance D2, and a third distance D3 is equal. By differentiating the distance between the adjacent protrusions 210 with different lengths, the alignment of the diverse protrusions 210 on the optical film 30 is adjusted so that moiré patterns are not easily produced or can appear less.

Figure 6:
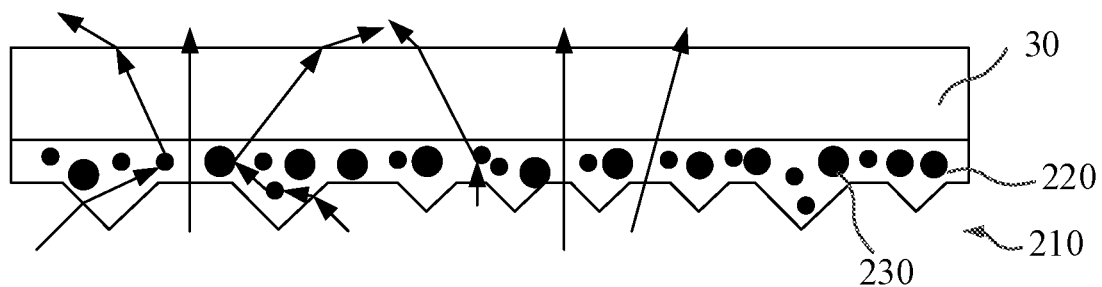
FIG. 6 is a schematic diagram illustrating a fifth structure of the concentrating structure in the backlight module as shown in FIG. 1.

Please refer to FIG. 6. FIG. 6 is a schematic diagram illustrating a fifth structure of the concentrating structure 20 in the backlight module as shown in FIG. 1. The concentrating structure 20 further includes a substrate 220. A plurality of protrusions 210 are disposed at one side of the substrate 220 close to the light-emitting unit 10. A plurality of particles 230 are disposed on the substrate 220. The particles 230 are configured to generate a diffuse reflection from the light emitted by the protrusion 210 to the optical film 30.

The size of one or more of the plurality of particles 230 is different from the size of the other particles 230. The plurality of particles 230 with diverse sizes improve the diffuse reflection of the light-emitting unit 10 better so as to enhance the light-emitting uniformity of the area on the optical film 30 that corresponds to the slit 40.

The number of particles 230 distributed in a unit area on the substrate 220 is different from the number of particles 230 distributed in another unit area on the substrate 220. By differentiating the density of the particles 230 distributed on the substrate 220, the diffuse reflection of the light to the particles 230 is better so as to improve the uniformity of light emission of the area on the optical film 30 that the slit 40 corresponds to. The particles 230 may perform the function of scattered light, such as silica particles.

The light emitted by the light-emitting unit 10 is reflected to the concentrating structure 20. Some of the light refracts through the plurality of different protrusions 210 in the concentrating structure 20, which expands the emissive direction of the light in the concentrating area 50. Some of the light is emitted into the concentrating area 50 from the connection between the different protrusions 210. After the light emits into and encounters the particles 230, diffuse reflection appears and the eminent angle enlarges, thereby expanding the uniformity effect of the light.

Figure 7:
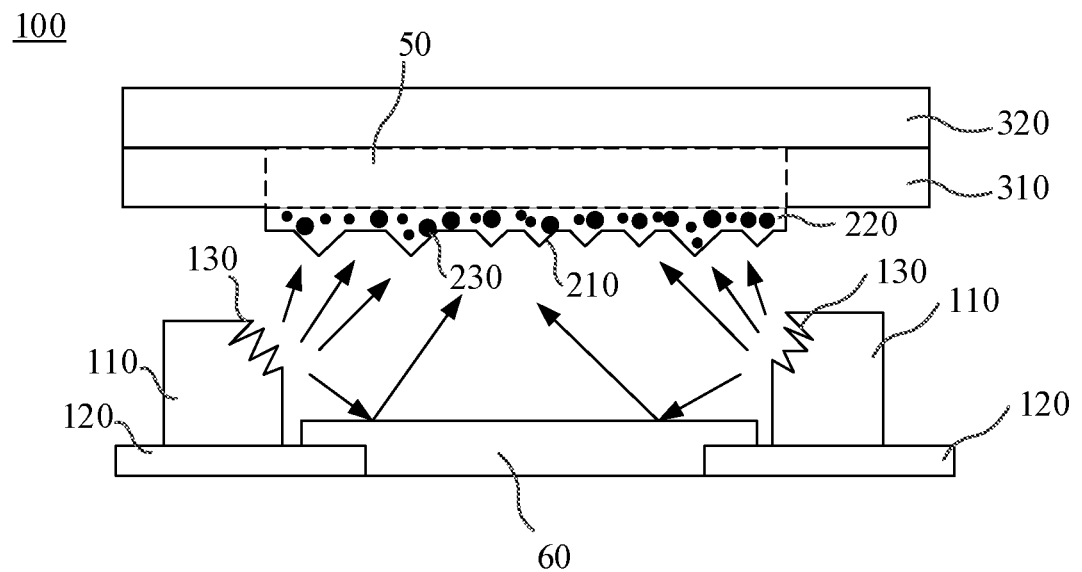
FIG. 7 is a schematic diagram illustrating a backlight module according to another embodiment of the present disclosure.

Please refer to FIG. 7. FIG. 7 is a schematic diagram illustrating a second structure of the backlight module proposed by the embodiment of the present disclosure. The light-emitting unit 10 includes a substrate 120 and a light source 110. The light source 110 is disposed at one side of the substrate 120 away from the optical film 30. The light source 110 can be taken as a point light source 110. The light source 110 may be an LED and a light bulb. The light source 110 required by the display panel is emitted by the light source 110. After the light source 110 penetrates the optical film 30, the light emitted by the light source 110 is scattered by the optical film 30. Accordingly, the light emitted by the light source 110 can be uniformly emitted, that is, providing the display panel with the uniform light source 110.

The backlight module 100 may be a mini light-emitting diode (Mini-LED) backlight module 100 while the substrate 120 may be a printed circuit board (PCB). The plurality of PCBs are spliced to form a mini LED plate. The light source 110 is defined as a mini LED. The plurality of mini LEDs are disposed on the mini LED plate.

In a preferred embodiment of the present disclosure, a prism 130 is arranged at one side of a light source 110 near a slit 40 to strengthen the light around the slit 40 where the light is weaker than other areas and a clear dark contrast appears compared with other areas. That is, the prism 130 is arranged on a mini light-emitting diode (Mini-LED) which is most adjacent to the slit 40. For example, the mini LED includes a first side and a second side. The first side is defined as a side near the slit 40, and the second side is defined as a side away from the slit 40. The prism 130 is arranged on the first side partially or totally. The prism 130 is configured to concentrate the light emitted by the light source 110 on the concentrating structure 20.

Two or more of the prisms 130 are adopted. The prisms 130 are arranged in parallel outside the light source 110. The plurality of prisms 130 may increase the luminous intensity of the light source 110 in the concentrating area 50 so that the light intensity of the concentrating area 50 on the optical film 30 is consistent with the light intensity of the other areas on the optical film 30 and that the light is evenly emitted by the optical film 30. The plurality of prisms 130 are connected to one another. At this time, the prisms 130 outside the light source 110 are arranged to form a zigzag shape to enhance the concentration effect.

The prism 130 can be a V-shaped prism, and a tip of the prism 130 is arranged away from the light source 110 and points to the concentrating area 50. So the shadow problem is effectively solved by increasing the light on some partial areas of the light source 110.

The diverse protrusions 210 in the concentrating structure 20 can scatter the concentrated light generated by the prism 130 to make the light intensity of the concentrating area 50 homogeneous and to avoid concentration of the light intensity of the concentrating area 50 due to the concentration effect generated by the prism 130. Besides, the concentrating structure 20 and the prism 130 helps to uniformize the light of the concentrating area 50 and to enhance the light intensity of the light source 110 on the concentrating area 50. In this way, the light intensity of the concentrating area 50 on the optical film 30 is consistent with the light intensity of the other areas on the optical film 30 so that the light can be evenly emitted by the optical film 30.

The backlight module 100 further includes a reflective layer 60. Two terminals of the reflective layer 60 are connected to the two adjacent substrates 120, respectively. The reflective layer 60 has a function of light reflection to prevent the slit 40 too dark. Specifically, a white colloid is sprayed at the slit 40 to fill the slit 40 so that the light irradiating on the slit 40 does not pass through the slit 40 directly. Instead, the light reflects onto the optical film 30 by the reflection of the white colloid. One side of the reflective layer 60 near a diffusion film 310 is smooth, which is advantageous for the reflection of the light.

The optical film 30 includes a prism film 320 and a diffusion film 310. The substrate of the diffusion film 310 needs to be a material having a high light transmission. The diffusion film 310 is configured to scatter light emitted by the light source 110. The prism film 320 has a function of concentration so the prism film 320 may improve the emissive direction of the light emitted by the light source 110 and increase the light intensity of the light emitted by the light source 110 so as to increase the brightness of the display panel. The present disclosure further proposes a display device including a backlight module 100 which is proposed by any of the embodiments of the present disclosure and a display panel. The display panel and the backlight module 100 are disposed opposite.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight module, comprising:
   a plurality of light-emitting units, disposed at intervals with one another, wherein a slit is between two adjacent light-emitting units;
   an optical film, disposed at a side of the light-emitting unit; and
   a concentrating structure, disposed at a side of the optical film close to the light-emitting unit and arranged in an area opposite to the slit, wherein the concentrating structure comprises a plurality of protrusions, wherein the size of the plurality of protrusions is different from one another.

2. The backlight module of claim 1, wherein the shape of the plurality of protrusions is different from one another.

3. The backlight module of claim 1, wherein the distance between the two adjacent protrusions is not equal to the other.

4. The backlight module of claim 1, wherein the light-emitting unit comprises a substrate and a light source; the light source is arranged at a side of the substrate away from the optical film; a prism is arranged at a side of the light source near the slit; the prism is configured to concentrate the light emitted by the light source on the concentrating structure.

5. The backlight module of claim 4, wherein the prism is V-shaped, and a tip of the prism is arranged away from the light source.

6. The backlight module of claim 4, wherein a reflective layer is disposed at the slit; two terminals of the reflective layer are connected to two adjacent substrates, respectively.

7. The backlight module of claim 1, wherein the optical film comprises a prism film and a diffusion film; the concentrating structure is arranged on the diffusion film; the prism film is arranged at a side of the diffusion film away from the concentrating structure.

8. A backlight module, comprising:
   a plurality of light-emitting units, disposed at intervals with one another, wherein a slit is between two adjacent light-emitting units;
   an optical film, disposed at a side of the light-emitting unit; and
   a concentrating structure, disposed at a side of the optical film close to the light-emitting unit and arranged in an area opposite to the slit, wherein the concentrating structure comprises a plurality of protrusions, wherein the concentrating structure further comprises a substrate; the plurality of protrusions are disposed at a side of the substrate close to the light-emitting unit; a plurality of particles are disposed on the substrate; the plurality of particles are configured to generate a diffuse reflection from the light emitted by the protrusion to the optical film.

9. The backlight module of claim 8, wherein the size of the plurality of particles is different from one another.

10. The backlight module of claim 8, wherein the number of particles distributed in a unit area on the substrate is different.

11. A display device, comprising:
    a display panel; and
    a backlight module disposed opposite, comprising:
       a plurality of light-emitting units, disposed at intervals with one another, wherein a slit is between two adjacent light-emitting units;
       an optical film, disposed at a side of the light-emitting unit; and
       a concentrating structure, disposed at a side of the optical film close to the light-emitting unit and arranged in an area opposite to the slit, wherein the concentrating structure comprises a plurality of protrusions, wherein the size of the plurality of protrusions is different from one another.

12. The display device of claim 11, wherein the shape of the plurality of protrusions is different from one another.

13. The display device of claim 11, wherein the distance between the two adjacent protrusions is not equal to the other.

14. The display device of claim 11, wherein the concentrating structure further comprises a substrate; the plurality of protrusions are disposed at a side of the substrate close to the light-emitting unit; wherein a plurality of particles, disposed on the substrate, are configured to generate a diffuse reflection from the light emitted by the protrusion to the optical film.

15. The display device of claim 14, wherein the size of the plurality of particles is different from one another.

16. The display device of claim 14, wherein the number of particles distributed in a unit area on the substrate is different.

* * * * *